United States Patent
Jaramillo et al.

(10) Patent No.: US 7,890,234 B1
(45) Date of Patent: Feb. 15, 2011

(54) VEHICLE OCCUPANT CLASSIFICATION SYSTEM

(75) Inventors: Jamison Jaramillo, Novi, MI (US);
Aaron J. Gauger, White Lake, MI (US);
David Strunk, Clawson, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 12/905,231

(22) Filed: Oct. 15, 2010

Related U.S. Application Data

(62) Division of application No. 11/948,730, filed on Nov. 30, 2007.

(51) Int. Cl.
*B60R 21/015* (2006.01)

(52) U.S. Cl. .................... 701/45; 356/614; 180/273; 340/667

(58) Field of Classification Search ............ 701/45; 356/614; 180/273; 340/667
See application file for complete search history.

(56) References Cited

U.S. PATENT DOCUMENTS

| | | | | |
|---|---|---|---|---|
| 5,913,245 A * | 6/1999 | Grossman | ............ | 73/800 |
| 5,988,676 A * | 11/1999 | Lotito et al. | ............ | 280/735 |
| 6,040,532 A * | 3/2000 | Munch | ............ | 177/144 |
| 6,250,672 B1 * | 6/2001 | Ryan et al. | ............ | 280/735 |
| 6,353,394 B1 * | 3/2002 | Maeda et al. | ............ | 340/667 |
| 6,356,200 B1 * | 3/2002 | Hamada et al. | ............ | 340/667 |
| 6,394,490 B2 | 5/2002 | Osmer et al. | | |
| 6,476,516 B1 | 11/2002 | Reich | | |
| 6,490,515 B1 * | 12/2002 | Okamura et al. | ............ | 701/49 |
| 6,912,912 B2 * | 7/2005 | Reichinger et al. | ............ | 73/800 |
| 6,920,256 B2 * | 7/2005 | Murad et al. | ............ | 385/12 |
| 7,088,113 B2 | 8/2006 | Basir et al. | | |
| 2003/0060957 A1 * | 3/2003 | Okamura et al. | ............ | 701/45 |
| 2003/0175001 A1 | 9/2003 | Lawrence et al. | | |
| 2004/0075444 A1 | 4/2004 | Basir et al. | | |
| 2004/0153229 A1 * | 8/2004 | Gokturk et al. | ............ | 701/45 |
| 2004/0247228 A1 * | 12/2004 | Murad et al. | ............ | 385/12 |
| 2005/0005706 A1 | 1/2005 | Reichinger et al. | | |
| 2005/0006151 A1 * | 1/2005 | Mattson et al. | ............ | 177/1 |
| 2005/0184565 A1 * | 8/2005 | Weiss et al. | ............ | 297/180.15 |
| 2005/0275555 A1 | 12/2005 | Murad et al. | | |
| 2007/0241895 A1 * | 10/2007 | Morgan | ............ | 340/561 |
| 2008/0224029 A1 * | 9/2008 | Kaiser | ............ | 250/231.19 |
| 2008/0234898 A1 * | 9/2008 | Wiener | ............ | 701/45 |

OTHER PUBLICATIONS

Leoni AG Central Research & Development, "Sensitive Light", Literature Handout, Jul. 2007, 1 page.

* cited by examiner

*Primary Examiner*—Thomas G Black
*Assistant Examiner*—Shelley Chen
(74) *Attorney, Agent, or Firm*—Global IP Counselors, LLP

(57) ABSTRACT

A vehicle seat pressure sensor includes a light source, a non-fiber optical polymer sheet, a boundary layer and a detection unit. The non-fiber optical polymer sheet is composed of non-woven flexible optical polymer material and has a first surface with a peripheral edge surrounding the first surface. The peripheral edge of the optical polymer sheet is aligned with the light source such that light emitted from the light source projects into the optical polymer sheet through the peripheral edge. The boundary layer is disposed along the first surface of the optical polymer sheet. The detection unit is disposed relative to the optical polymer sheet to detect changes in attenuation of light emitted from the peripheral edge of the optical polymer sheet in response to elastic deformation of the boundary layer and the optical polymer sheet.

16 Claims, 10 Drawing Sheets

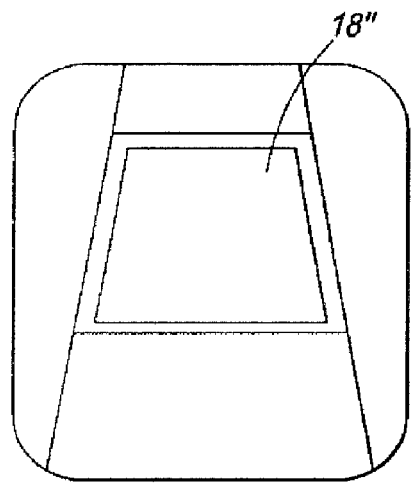
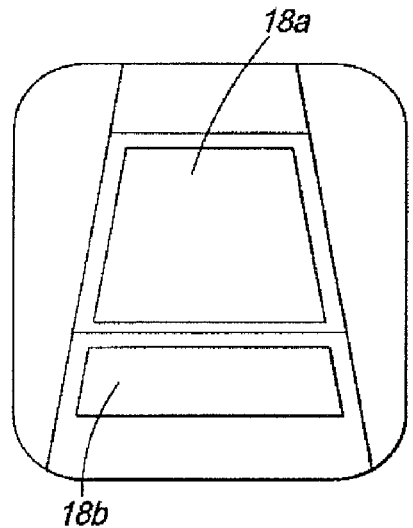
FIG. 14　　　　　　FIG. 15
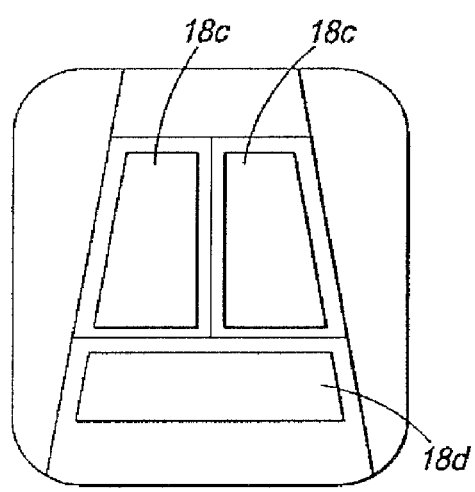
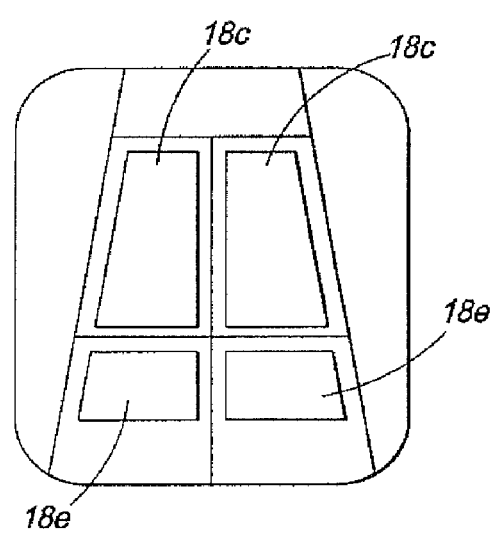
FIG. 16　　　　　　FIG. 17

VEHICLE OCCUPANT CLASSIFICATION SYSTEM

CROSS-REFERENCE TO RELATED APPLICATIONS

This application is a divisional application of U.S. patent application Ser. No. 11/948,730 filed on Nov. 30, 2007. The entire disclosures of U.S. patent application Ser. No. 11/948,730 is hereby incorporated herein by reference.

BACKGROUND OF THE INVENTION

1. Field of the Invention

The present invention relates to a vehicle occupant classification system that includes an optical pressure sensor. More specifically, the present invention relates to vehicle occupant classification system configured to determine the absence or presence of a passenger in a vehicle seat and classify the passenger in accordance with airbag deployment requirements.

2. Background Information

Various portions of vehicles are continuously being re-designed and modified to meet changes in safety standards. For example, in recent years airbags have been introduced to protect passengers in the event of an impact event. All airbags are operably connected to an airbag deployment system which typically includes a triggering device. The triggering device detects rapid changes in acceleration due to an impact event. Upon the detection of a potentially life threatening impact event, the triggering device sends a signal to the airbag deployment system instructing the system to deploy the airbag(s).

One recent development in airbag deployment systems is the inclusion of an occupant detection system that determines whether or not a passenger is seated in one of the vehicle seats. One such occupant detection system includes a pressure sensor that monitors the vehicle seat. When a passenger sits in the seat, the pressure sensor detects the mass of the passenger and sends a signal to the airbag deployment system. In response to receiving such a signal, the airbag deployment system arms the airbag such that during an impact event, the airbag deploys. If no passenger is present in the vehicle seat, the airbag does not get armed and the airbag does not deploy during an impact event.

One proposed development in airbag technology is an airbag with multiple levels of deployment. Such an airbag can be provided with two or more levels or stages of deployment, such as first deployment stage for a large passenger and a second deployment stage for a small passenger. A problem with such an airbag deployment configuration is that current airbag deployment systems and corresponding occupant detection systems are not provided with reliable means for categorizing the weight of passengers seated in a vehicle seat.

Further, current occupant detection systems are not able to distinguish between a passenger seated on a passenger seat and cargo resting on a passenger seat.

In view of the above, it will be apparent to those skilled in the art from this disclosure that there exists a need for an improved occupant detection system for vehicle seats that can determine whether or not the load on a vehicle seat is a passenger or cargo, such as luggage or a bag of groceries, nor can such systems approximate the weight of a passenger(s) seated in a vehicle seat. This invention addresses this need in the art as well as other needs, which will become apparent to those skilled in the art from this disclosure.

SUMMARY OF THE INVENTION

One object of the present invention is to provide a vehicle with an occupant classification system that can distinguish between a passenger seated on a vehicle seat and cargo resting on the vehicle seat within the vehicle.

Another object of the present invention is to provide a vehicle with an occupant classification system that determines the approximate weight of a passenger seated on a seat within the vehicle.

Still another object of the present invention is to provide a vehicle with an occupant classification system that can provide airbag deployment classification information to an airbag deployment system based upon detection of mass positioned on a seat within the vehicle.

In accordance with one aspect of the present invention, a vehicle seat pressure sensor includes a light source, a non-fiber optical polymer sheet, a boundary layer and a detection unit. The non-fiber optical polymer sheet is composed of non-woven flexible optical polymer material that has a first surface with a peripheral edge surrounding the first surface. The peripheral edge of the optical polymer sheet is aligned with the light source such that light emitted from the light source projects into the optical polymer sheet through the peripheral edge. The boundary layer is disposed along the first surface of the optical polymer sheet. The detection unit is disposed relative to the optical polymer sheet to detect changes in attenuation of light emitted from the peripheral edge of the optical polymer sheet in response to elastic deformation of the boundary layer and the optical polymer sheet.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 14 is a cross-sectional view of a seat cushion and a pressure sensor in accordance with a third embodiment of the present invention;

FIG. 15 is a cross-sectional view of a seat cushion and a pressure sensor in accordance with a fourth embodiment of the present invention;

FIG. 16 is a cross-sectional view of a seat cushion and a pressure sensor in accordance with a fifth embodiment of the present invention;

FIG. 17 is a cross-sectional view of a seat cushion and a pressure sensor in accordance with a sixth embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
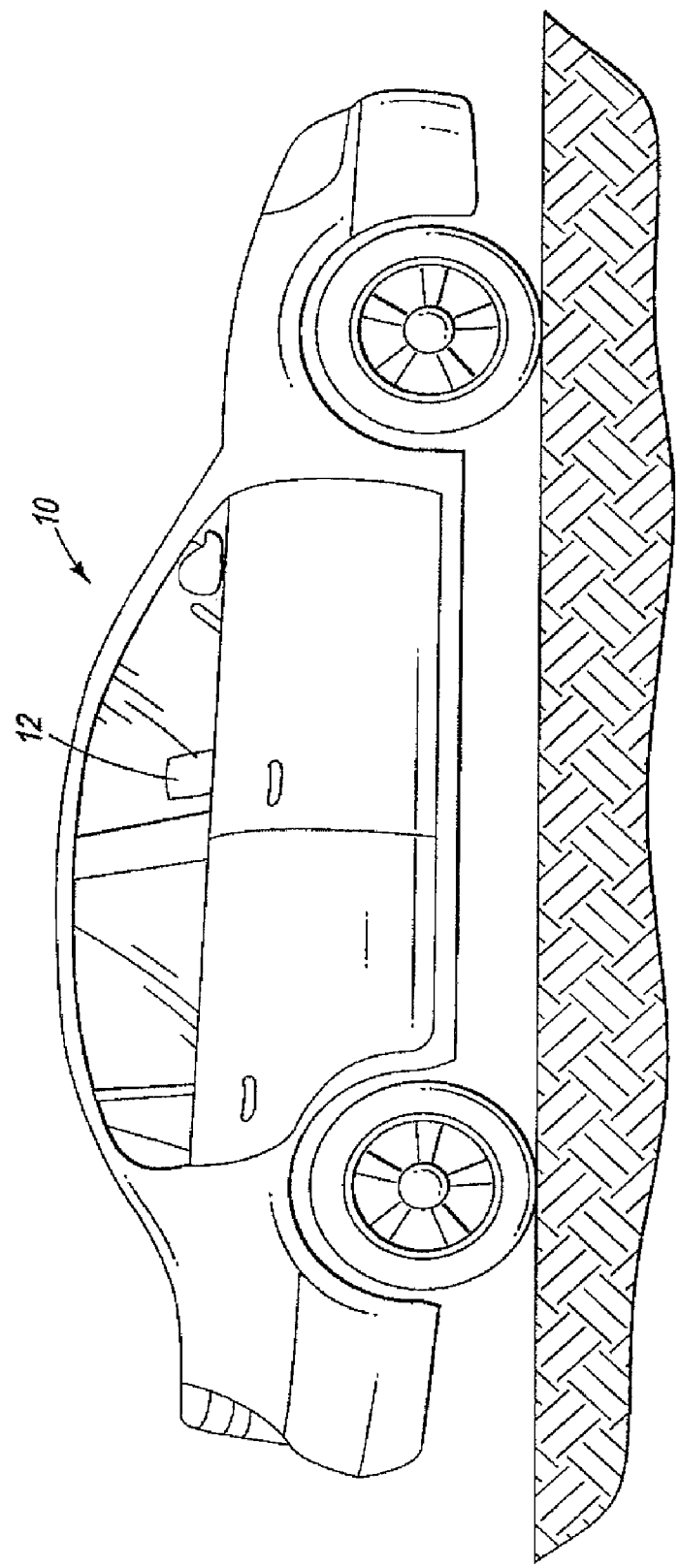
FIG. 1 is a side elevational view of a vehicle that has a seat in accordance with the present invention.

Referring initially to FIG. 1, a vehicle 10 having a seat 12 is illustrated in accordance with a first embodiment of the present invention.

Figure 2:
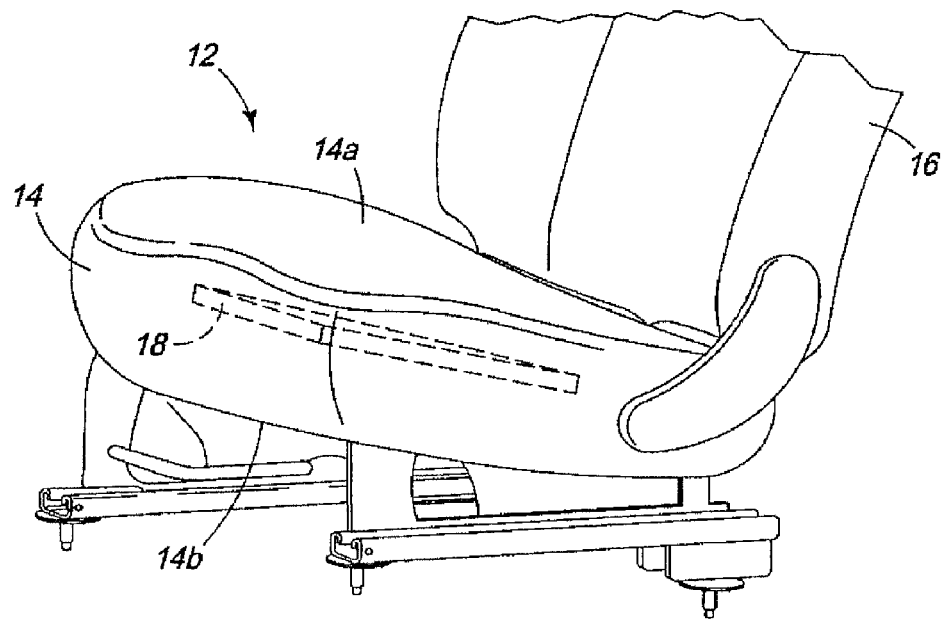
FIG. 2 is a fragmentary perspective view of the seat removed from the vehicle showing a seat back portion and a seat cushion portion, the seat cushion portion including a pressure sensor in accordance with the present invention.
Figure 3:
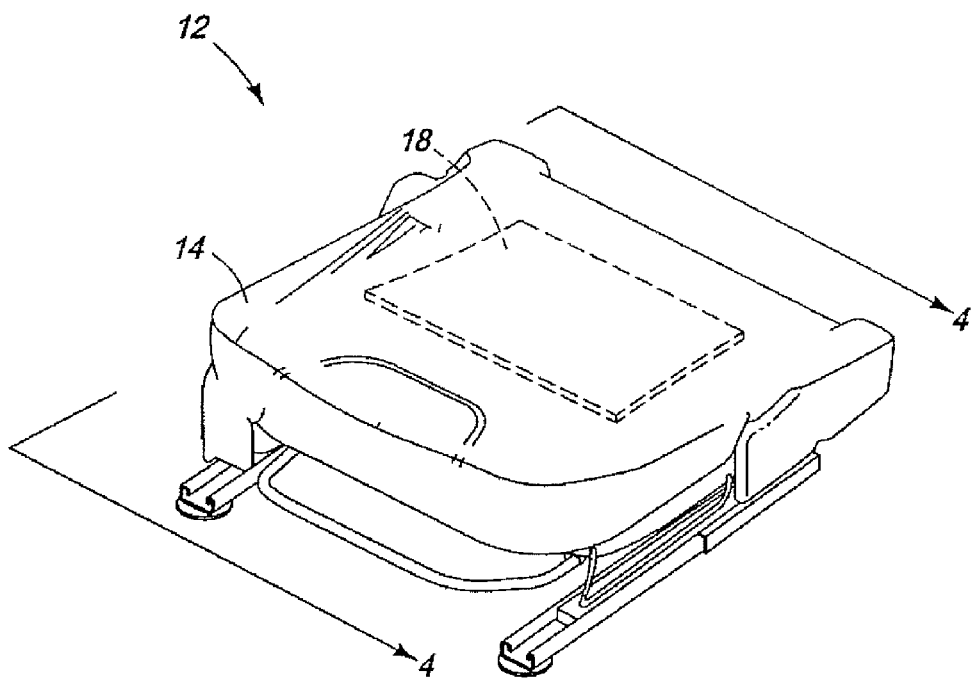
FIG. 3 is another perspective view of the seat showing only the seat cushion portion and the pressure sensor in accordance with a first embodiment of the present invention.

As best shown removed from the vehicle 10 in FIGS. 2 and 3, the seat 12 includes a seat cushion portion 14 and a seat back portion 16 (shown in FIG. 2 only). The seat cushion portion 14 includes an upper surface 14a and a lower surface 14b. A pressure sensor 18 is installed within the seat cushion portion 14 between the upper and lower surfaces 14a and 14b, such that the pressure sensor 18 is spaced apart from both the upper surface 14a and the lower surface 14b.

The pressure sensor 18 installed within the seat cushion portion 14 is preferably electronically connected to an occupant classification system 22 or OCS 22 (shown in FIG. 9) and described in greater detail below. The OCS 22 is in turn connected to an airbag deployment system 24 (also shown in FIG. 9) that is described in greater detail below. The pressure sensor 18 and the OCS 22 are configured and arranged to estimate a weight and location of a load placed on the seat cushion portion 14 and also configured and arranged to distinguish between the presence of a passenger and the presence of cargo placed on the seat cushion portion 14, as described below.

More specifically, the pressure sensor 18 is a primary sensor for the OCS 22 and is configured to measure the presence of and amount of pressure exerted by an object placed upon the upper surface 14a of the seat cushion portion 14, as described in greater detail below. The OCS 22 uses signals from the pressure sensor 18 to determine whether or not the object placed on the seat cushion 14 is a person, a children's car seat or a load of cargo, such as grocery bags or luggage. The determination made by the OCS 22 is then provided to the airbag deployment system 24, as described in greater detail below.

Figure 4:
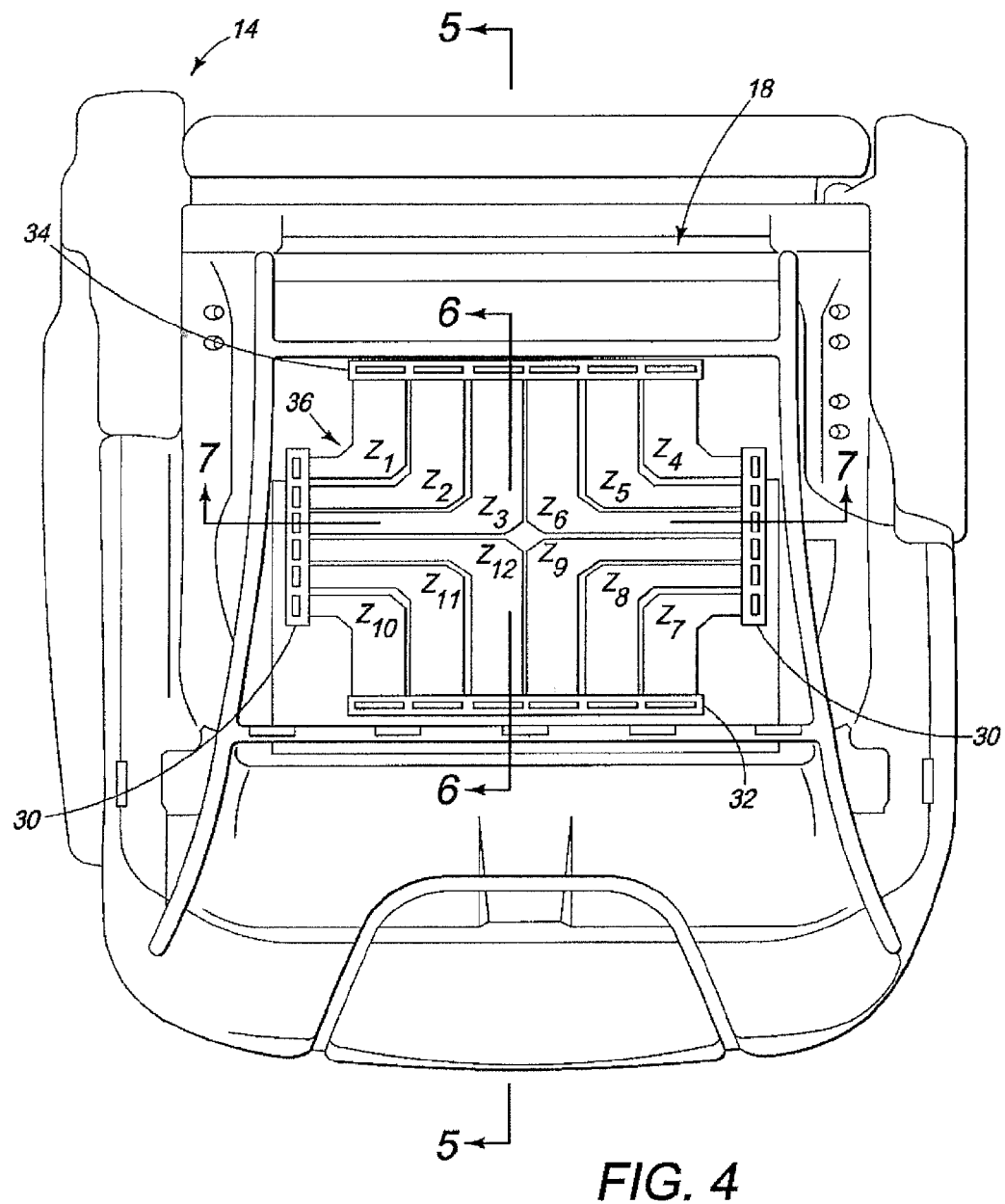
FIG. 4 is a cross-sectional view of the seat cushion portion taken along the line 4-4 in FIG. 3, showing details of the pressure sensor in accordance with the first embodiment of the present invention.
Figure 5:
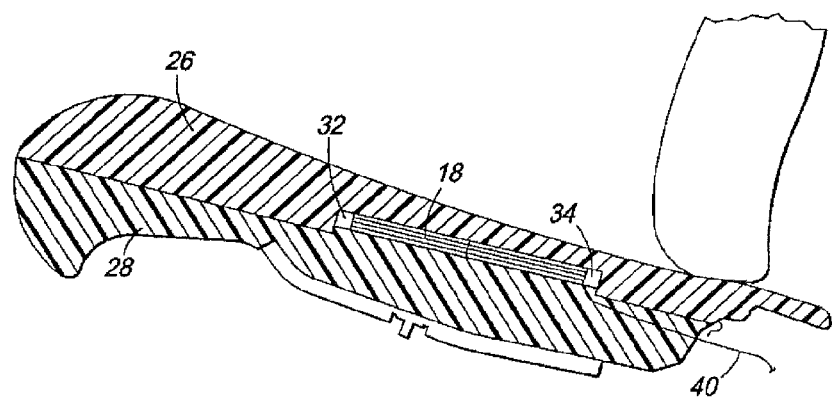
FIG. 5 is another cross-sectional view of the seat cushion portion taken along the lines 5-5 in FIG. 4, showing relative positions of sections of the seat cushion portion and the pressure sensor in accordance with the first embodiment of the present invention.

A first embodiment of the pressure sensor 18 is now provided with specific reference to FIGS. 4-8. As shown in FIG. 5, the pressure sensor 18 is installed between a first cushion section 26 and a second cushion section 28. However, it should be understood from the drawings and the description herein, that the pressure sensor 18 can be installed in seat cushion portions differing from the seat cushion portion 14. Specifically, the seat cushion portion 14 can be replaced with a seat cushion having a single body with a pocket formed therein to receive the pressure sensor 18. Alternatively, the pressure sensor 18 can be installed at the top of a seat cushion portion covered only by an outer covering (not shown) such as, for example, textile material, leather material or imitation leather material. However, in the first embodiment, the pressure sensor 18 is preferably disposed at a location within the seat cushion portion 14 spaced apart from and below the upper surface 14a of the seat cushion portion 14. More preferably, the pressure sensor 18 is molded into the seat cushion portion 14 with approximately 5-10 mm distance between the pressure sensor 18 and the upper surface 14a (a seating surface) of the seat cushion portion 18. Consequently, there is a finite amount of seat cushion material between the pressure sensor 18 and the seat cushion portion 14 and less foam density effect on pressure measurement of the pressure sensor 18.

Figure 8:
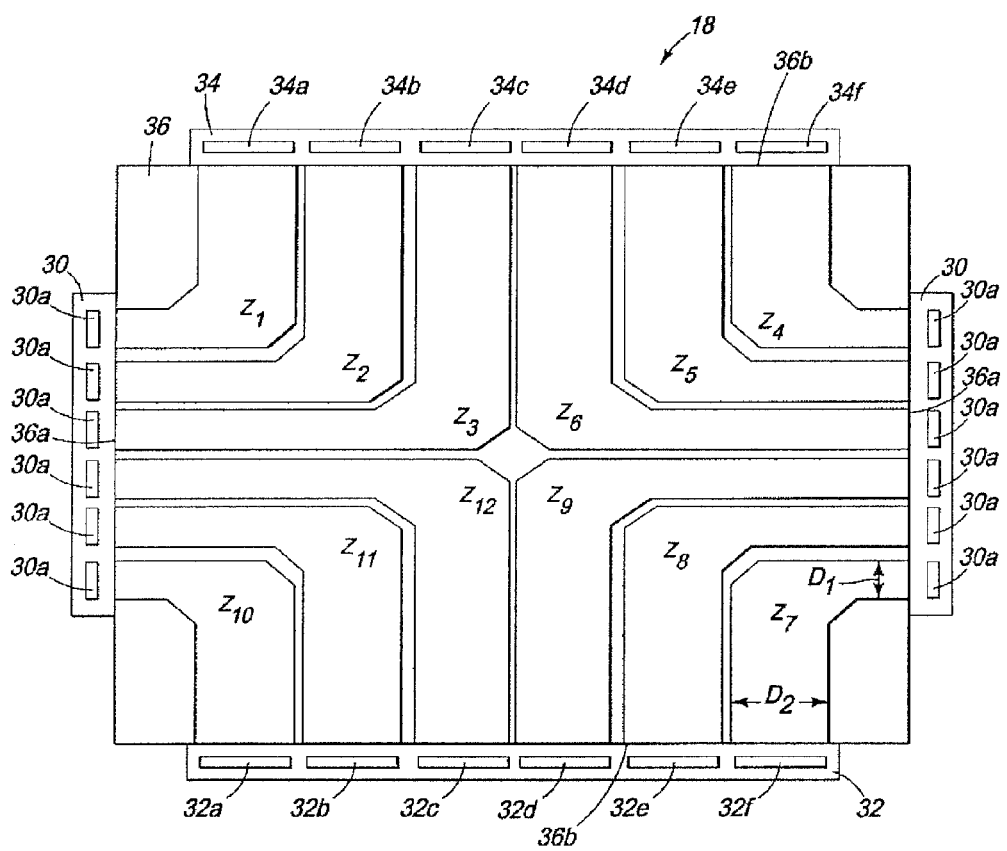
FIG. 8 is a schematic top view of the pressure sensor shown removed from the seat cushion portion, showing a plurality of zones in accordance with the first embodiment of the present invention.

As best shown in FIGS. 4 and 8, the pressure sensor 18 basically includes a pair of light sources 30, a pair of detection units 32 and 34 and a sensor mat 36. The pressure sensor 18 is further preferably divided into a plurality of sub-sensors or zones $Z_1$-$Z_{12}$, described in greater detail below.

Figure 7:
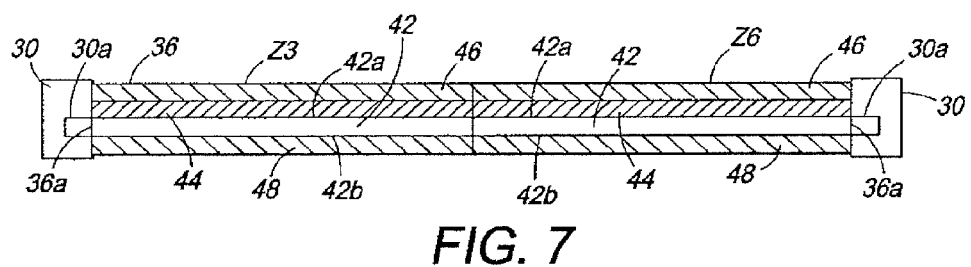
FIG. 7 is another cross-sectional view of the pressure sensor taken along the line 7-7 is FIG. 4, showing the various layers and a light source of the pressure sensor in accordance with the first embodiment of the present invention.

As shown best in FIGS. 7 and 8, the light sources 30 are disposed along peripheral edges 36a of the sensor mat 36. Specifically, a first light emitting portion of the light source 30 disposed at a first location along the peripheral edge 36a of an optical polymer sheet 42 (described below) and a second light emitting portion of the light source 30 is disposed at a second location along the peripheral edge 36a of the optical polymer sheet 42, as best shown in FIG. 8. Preferably, each of the light sources 30 each includes a plurality of light-emitting diodes or LEDs 30a. Each respective LED 30a provides light to a corresponding one of the zones $Z_1$-$Z_{12}$. In the depicted first embodiment, each of the light sources 30 includes six LEDs 30a. Specifically, one of the light sources 30 includes six LEDs 30a that provide light to respective ones of the zones $Z_1$-$Z_3$ and $Z_{10}$-$Z_{12}$ of the sensor mat 36 and the other of the light sources 30 includes six LEDs that provide light to respective ones of the zones $Z_4$-$Z_6$ and $Z_7$-$Z_9$ of the sensor mat 36. Power is supplied to the light sources 30 via power lines (not shown) that extending from the detection unit 34. The power lines to the light sources 30 are preferably imbedded within the sensor mat 36 but can alternatively extend along an edge of the sensor mat 36 from the light sources 30 to the detection unit 34 and are therefore hidden from view.

Alternatively, the LEDs 30a can be replaced with prisms to split light across each zone from a single LED within each light source 30.

The detection units 32 and 34 are light attenuation measurement devices that are disposed along opposite peripheral edges 36b of the sensor mat 36. The detection units 32 and 34 are configured to detect changes in attenuation of light emitted from the peripheral edges 36b of the sensor mat 36 in response to elastic deformation thereof, as described further below. The detection units 32 and 34 are also configured to detect dielectric capacitance changes relative to the sensor mat 36, as is also described further below. The detection unit 32 includes six separate detection sections 32a, 32b, 32c, 32d, 32e and 32f. Each detection section 32a-32f includes an LED sensor that is separately wired to provide separate discrete signals to the OCS 22. More specifically, the detection section 32a is configured to detect attenuation changes in the zone $Z_{10}$, the detection section 32b is configured to detect attenuation changes in the zone $Z_{11}$, the detection section 32c is configured to detect attenuation changes in the zone $Z_{12}$, the detection section 32d is configured to detect attenuation changes in the zone $Z_9$, the detection section 32e is configured to detect attenuation changes in the zone $Z_8$ and the detection section 32f is configured to detect attenuation changes in the zone $Z_7$.

Similarly, the detection unit 34 includes six separate detection sections 34a, 34b, 34c, 34d, 34e and 34f. Each of the detection sections 34a-34f includes an LED sensor that is separately wired to provide separate discrete signals to the OCS 22. More specifically, the detection section 34a is configured to detect attenuation changes in the zone $Z_1$, the detection section 34b is configured to detect attenuation changes in the zone $Z_2$, the detection section 34c is configured to detect attenuation changes in the zone $Z_3$, the detection section 34d is configured to detect attenuation changes in the zone $Z_6$, the detection section 34e is configured to detect attenuation changes in the zone $Z_5$ and the detection section 34f is configured to detect attenuation changes in the zone $Z_4$.

The detection units 32 and 34 are generally identical, except for their respective locations and the detection unit 34 includes an external set of electric power and transmission lines or lead wire harness 40 (shown in FIGS. 5 and 9) that connects to the OCS 22. The lead wire harness 40 provides power to the LEDs 30a and the detection units 32 and 34. The lead wire harness 40 further carries signals transmitted from the detection units 32 and 34 to the OCS 22. The detection unit 32 is electrically connected to the detection unit 34 by transmission and power lines (not shown) that are preferably imbedded within the sensor mat 36 but can alternatively extend along edges of the sensor mat 36 from the detection unit 32 to the detection unit 34.

As is shown in FIG. 8, the light sources 30 and the detection unit 32 and 34 are arranged perpendicularly to one another along the peripheral edge of the sensor mat 36.

Figure 6:
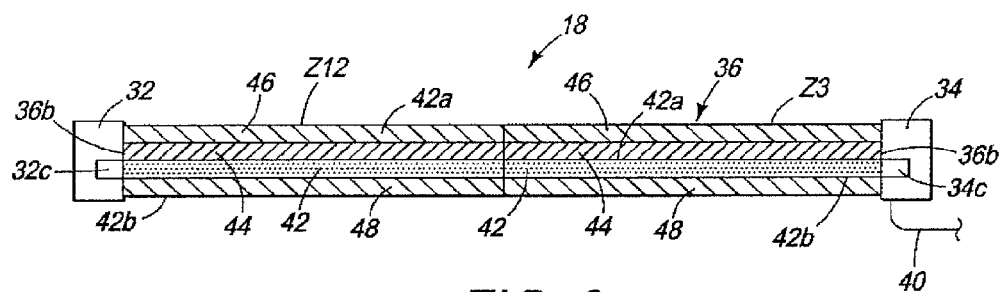
FIG. 6 is a cross-sectional view of the pressure sensor taken along the line 6-6 is FIG. 4, showing the various layers and a detection unit of the pressure sensor in accordance with the first embodiment of the present invention.

A description of the sensor mat 36 of the pressure sensor 18 is now provided with specific reference to FIGS. 6, 7 and 8.

The sensor mat 36 includes twelve separate zones $Z_1$-$Z_{12}$. Each of the zones $Z_1$-$Z_{12}$ has an L-shape. The zones $Z_1$-$Z_{12}$ are arranged within the sensor mat 36 in order to provide weight and location information to the OCS 22 when cargo, a passenger or a car seat is placed on the seat 12.

In the cross-sectional view of the sensor mat 36 in FIG. 6, only zones $Z_3$ and $Z_{12}$ are depicted. It should be understood from the drawings and the description herein, that the zones $Z_1$-$Z_{12}$ are operationally all the same. All of the zones $Z_1$-$Z_{12}$ function, respond to deformation and response to the proximity of a passenger seated in the seat 12, in generally the same manner. In other words, each zone responds to pressure in a consistent manner with respect to the others of the zones $Z_1$-$Z_{12}$. However, the distribution of weight of a passenger seated on the seat cushion portion 14 differs from zone to zone. Therefore, each of the zones $Z_1$-$Z_{12}$ will output a weight signal proportional to the pressure exerted on that particular zone.

The zones $Z_1$-$Z_{12}$ differ from one another within the sensor mat 36 only in that they each are disposed within a different portion of the sensor mat 36 and each have slightly differing dimensions. However, each of the zones $Z_1$-$Z_{12}$ operates and transmits light and is attenuated by deformation in generally the same manner. Therefore the description herein of the zones $Z_3$ and $Z_{12}$ of the sensor mat 36 applies equally to each and every one of the zones $Z_1$-$Z_{12}$.

Hereinafter, it should be understood that reference below to the various elements and layers of the sensor mat 36 refers equally to the elements and layers of each individual one of the zones $Z_1$-$Z_{12}$.

As shown in FIG. 6, the sensor mat 36 basically includes the non-fiber optical polymer sheet 42, a boundary layer 44, a first optical insulating layer 46 and a second optical insulating layer 48.

The optical polymer sheet 42 is a non-woven flexible optical polymer material having a first surface 42a and a second surface 42b that are approximately parallel to one another. A peripheral edge of the optical polymer sheet 42 corresponding to the peripheral edge 36a of the sensor map 36, at least partially surrounds the first surface 42a. The peripheral edge of the optical polymer sheet 42 is aligned with a corresponding one of the LED 30a of the light source 30 such that light emitted from the light source 30 projects into the optical polymer sheet 42 through the peripheral edge 36a, as indicated in FIG. 7.

As used herein with respect to the sensor mat 36 and the optical polymer sheet 42, the term sheet material means a material that has length and width that are substantially greater than the thickness of these materials. In other words, a sheet material can be laid flat and is not a fiber nor is it an array of fibers. Rather, the sheet material is a generally homogeneous material that is flat in an unstressed state, but is flexible such that it can elastically deform and return to a generally planar orientation. On opposing surfaces (i.e. the first and second surfaces 42a and 42b) defined by the length and width of the material, the surfaces are generally smooth, but need not be perfectly planar, but need only be generally planar. In other words, the sheet material can have slight irregularities in thickness, but has a generally consistent thickness throughout.

The optical polymer sheet 42 is preferably made as a sheet material of polyurethane or other similar extra-flexible optical polymer material. The optical polymer sheet 42 preferably has a thickness that is no greater than four millimeters (mm) measured between the first and second surfaces 42a and 42b. However, in the first embodiment, the optical polymer sheet 42 has a thickness of preferably between 0.5-1.0 mm in order to carry a suitable optical signal generated by the LEDs 30a of the light sources 30. The optical polymer sheet 42 has an index of refraction $N_1$.

The boundary layer 44 is disposed along the first surface 42a of the optical polymer sheet 42. The boundary layer 44 is made of a material that has an index of refraction $N_2$, where $N_2$ is greater than $N_1$. The boundary layer 44 bonded, fixed and/or fused directly to the first surface 42a. The boundary layer 44 is preferably located above the optical polymer sheet 42 relative to the orientation of the seat cushion portion 14. In other words, the boundary layer 44 is preferably located between the upper surface 14a of the seat cushion portion 14 and the first surface 42a of the optical polymer sheet 42. The boundary layer 44 functions to attenuate the small amount of electromagnetic field outside of the total internal reflection of light within the optical polymer sheet 42. For example, when any pressure is exerted on the boundary layer 44, the light levels, phase and polarity of the LEDs 30a of the light sources 30 are affected according to how much the boundary layer 44 is deformed. The changes in the light levels, phase and polarity are detected by respective ones of the LED sensors of the sections 32a-32f and 34a-34f of the detection units 32 and 34.

The first optical insulating layer 46 is fixed to and covers the upper surface of the boundary layer 44 opposite the optical polymer sheet 42 and the second optical insulating layer 48 is fixed to and covers the second surface 42b of the optical polymer sheet 42 opposite the boundary layer 44.

The first and second optical insulating layers 46 and 48 preferably extend along the entire distance of the sensor mat 36, between the light sources 30 and between the detection units 32 and 24 providing overall support for the sensor mat 36.

As mentioned above, the optical polymer sheet 42 is preferably made of polyurethane or other similar extra-flexible optical polymer material. The boundary layer 44 can be also be made of polyurethane or other similar extra-flexible optical polymer material with desired attenuating characteristics, (for example, opaqueness) such that the boundary layer 44 attenuates the evanescent field in the optical polymer sheet 42. Similarly, the first and second optical insulating layers 46 and 48 can be made of polyurethane or other similar extra-flexible optical polymer material, but can be altered or blended to provide the desired optical insulating properties to shield and protect the operation and function of the optical polymer sheet 42 and the boundary layer 44. Such materials are conventional and can be engineered with the appropriate properties and characteristics to achieve the operation of the sensor mat 36 as described herein.

The optical polymer sheet 42 includes a plurality of optical polymer sheet sections defining a plurality of sensing areas or zones $Z_1$-$Z_{12}$ with each of the zones $Z_1$-$Z_{12}$ at least partially forming a part of the peripheral edges 36a and 36b of the optical polymer sheet 42. The zones $Z_1$-$Z_{12}$ vary in size relative to one another. However these size differences are a design choice and are not intended to limit the invention. Each of the optical polymer sheet 42 sections or zones $Z_1$-$Z_{12}$ has an L-shape with a first end disposed along the peripheral edge 36a of the optical polymer sheet adjacent the light source and a second end disposed along the peripheral edge 36b of the optical polymer sheet 42 adjacent the detection unit 32 or 34. Although each of the zones $Z_1$-$Z_{12}$ is depicted with an L-shape, it should be understood from the drawings and the description herein, that the zones $Z_1$-$Z_{12}$ can be defined with any of a variety of shapes. The L-shape is a convenient shape, but not the only shape possible.

The surfaces of the sensor mat 36 in any given one of the zones $Z_1$-$Z_{12}$ are preferably provided with minimum dimensions, such as first and second linear dimensions $D_1$ and $D_2$ shown in zone $Z_7$ in FIG. 8. In the first embodiment, the first linear dimension $D_1$ is preferably at least 23 millimeters as measured perpendicular to the thickness of the optical polymer sheet 42. The second linear dimension $D_2$ is at least 40 millimeters as measured perpendicular to the thickness of the optical polymer sheet 42.

It should be understood from the drawings and the description herein that the optical polymer sheet 42 and the boundary layer 44 can both be cut into the L-shaped sections that define the individual sub-sensors or zones $Z_1$-$Z_{12}$ described above. In other words, the shapes and sizes of the zones $Z_1$-$Z_{12}$ is determined by the size and shapes of the individually cut portions of the optical polymer sheet 42 and the boundary layer 44. The zones $Z_1$-$Z_{12}$ can be physically separated from one another (spaced apart from one another by a predetermined distance) or alternatively, the abutting edges of at least the optical polymer sheet 42 and the boundary layer 44 of adjacent ones of the zones $Z_1$-$Z_{12}$ can be coated with a non-light transmitting material (not shown).

As shown in FIG. 8, the optical polymer sheet 42 can include at least four separate areas or sections of the optical polymer sheet 42, each having three different L-shaped zones of the zones $Z_1$-$Z_{12}$. The first area or section includes zones $Z_1$-$Z_3$, the second area or section includes zones $Z_4$-$Z_6$, the third area or section includes zones $Z_7$-$Z_9$ and the fourth area or section includes zones $Z_{10}$-$Z_{12}$. The four separate areas or sections are arranged such that the first ends of a first pair of the at least four of the optical polymer sheet sections (zones $Z_1$-$Z_3$ and zones $Z_4$-$Z_6$) face in a first direction and a second pair of the at least four of the optical polymer sheet sections (zones $Z_7$-$Z_9$ and zones $Z_{10}$-$Z_{12}$) face in a second direction that is opposite the first direction.

The boundary layer 44 can extend beyond the edges of the zones $Z_1$-$Z_{12}$ or can be cut to the same size and each portion of the optical polymer sheet 42 that defines each of the zones $Z_1$-$Z_{12}$. Hence, the first and second optical insulating layers 46 and 48 bind the zones $Z_1$-$Z_{12}$ together.

The first and second optical insulating layers 46 and 48 are preferably made of a material with an index of refraction $N_3$, where $N_3$ is greater than $N_2$ and greater than $N_1$. The first and second optical insulating layers 46 and 48 also function to protect the optical polymer sheet 42 and the boundary layer 44 from the first and second cushion sections 26 and 28 of the seat cushion portion 14 during the seat cushion forming process, described below. Each of the layers of the sensor mat 18, the first optical insulating layer 46, the boundary layer 44, the optical polymer sheet 42 and the second optical insulating layer 48, are all bonded and/or fused together to form a unified body that defines the sensor mat 36 that preferably has a thickness of not more than 2 mm. Further, the LEDs 30a and the detection sections 32a-32f and 34a-34f are likewise bonded and/or fused to the respective peripheral edges 36a and 36b of the sensor mat 18.

Thus, when any pressure is exerted on the boundary layer 44, the light levels, phase and polarity of light from the LEDs 30a are affected according to how much the boundary layer 44 and optical polymer sheet 42 are deformed. Changes in light attenuation, phase and polarity are more easily measured than measuring piezoelectric effect changes in terms of measuring pressure from a seated occupant.

Figure 9:
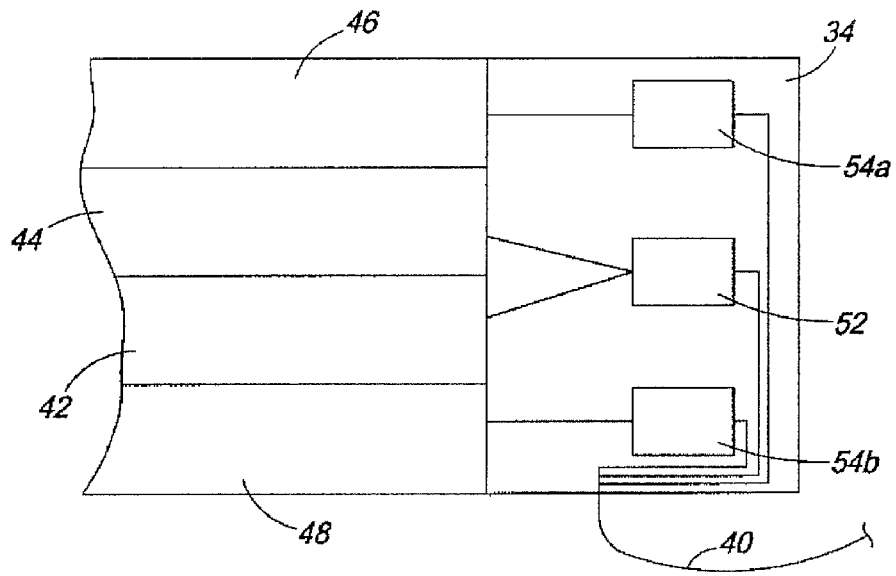
FIG. 9 is a schematic side cross-sectional view of a portion of the pressure sensor showing electrodes connected to layers of the pressure sensor for detection of changes in dielectric properties in accordance with the first embodiment of the present invention.

As shown in FIG. 9, the detection unit 34 includes dielectric effect detectors 52, 54a and 54b. The dielectric effect detector 52 is electrically connected to one or both of the optical polymer sheet 42 and the boundary layer 44. The dielectric effect detectors 54a and 54b are electrically connected to respective ones of the second optical insulating layer 48 and the first optical insulating layer 46. The dielectric effect detectors 52, 54a and 54b are configured to sense changes in capacitance within and around the sensor mat 36. Specifically, the first and second optical insulating layers 46 and 48 along with the optical polymer sheet 42 basically define the plates of a capacitor. The dielectric constant of adjacent materials affects the capacitance of the sensor mat 36. The changes in capacitance due to the specific dielectric properties of materials within and around the senor mat 36 are sensed by the dielectric effect detectors 52, 54a and 54b and transmitted via the lead wire harness 40 to the OSC 22. In other words, a dielectric capacitance effect can be induced on the layers of the sensor mat 36, enabling the sensor mat 36 to serve as an occupant detection sensor.

As described above, the specific configuration of the zones $Z_1$-$Z_{12}$ of the sensor mat 36 is such that the light sources 30 emit light to each of the sensing zones $Z_1$-$Z_{12}$. Further, the detection sections 32a-32f and 34a-34f of the detection units 32 and 34 are disposed to separately detect the separate light beam from each of the zones $Z_1$-$Z_{12}$.

As described above, the detection units 32 and 34 are disposed relative to the optical polymer sheet 42 to detect changes in attenuation of light emitted from the peripheral edges 36b of the optical polymer sheet 42 in response to elastic deformation of the boundary layer 44 and the optical polymer sheet 42. As also described above, the detection units 32 and 34 detect dielectric capacitance changes of the optical polymer sheet 42 and at least one of the first and second optical insulating layers 46 and 48 in response to changes in dielectric capacitance proximate the at least one of the first and second optical insulating layers 46 and 48 and the optical polymer sheet 42. The detection units 32 and 34 transmit signals to the OCS 22 via the lead wire harness 40.

Figure 10:
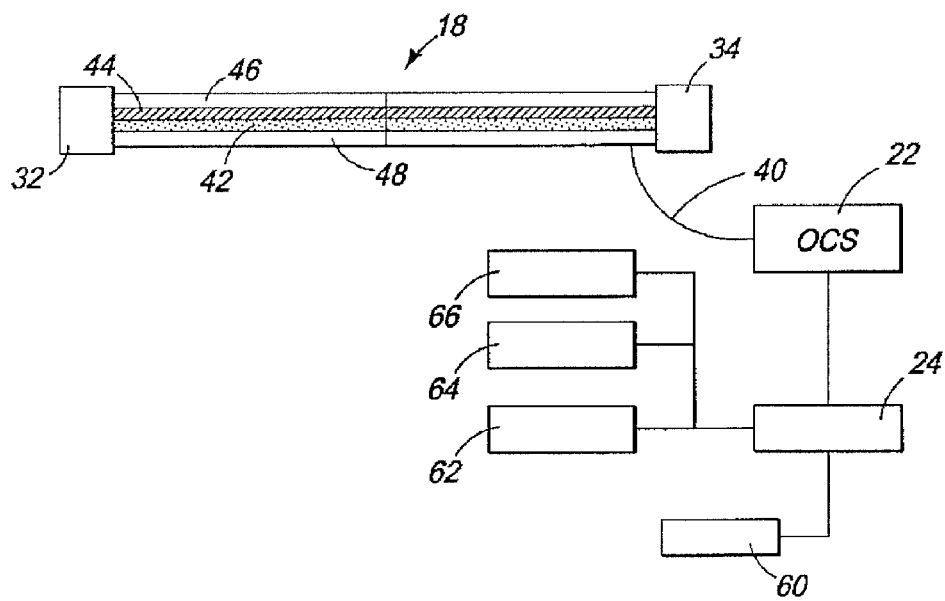
FIG. 10 is a schematic side cross-sectional view of the pressure sensor showing connections to an occupancy classification system, an airbag deployment controller and airbags in accordance with the first embodiment of the present invention.

With specific reference to FIG. 10, a description of the OCS 22 and the airbag deployment system 24 is now provided. The OCS 22 (occupant classification system) is a processing unit that is connected to the detection unit 34 via the lead wire harness 40. The OCS 22 is configured to process signals from the detection units 32 and 34, based on output from the pressure sensor 18 and estimate a weight and location of a load placed on the seat cushion portion 14. The OCS 22 is also configured to determine the presence of a passenger based upon signals outputted by the detection unit 34 and the dielectric effect detectors 52, 54a and 54b. The OCS 22 is electrically connected to the airbag deployment system 24, which is in turn electrically connected to an impact event detection unit 60 and airbags 62, 64 and 66. It should be understood that any number of airbags and/or air curtains can be connected to the airbag deployment system 24. In the described embodiment, three airbags 62, 64 and 66 are shown as an example only. For instance, the airbags 62 and 64 can be a single airbag device with two levels of deployment, where the airbags 62 and 64 can be deployed separately or both at the same time, as is made clearer below. The airbag 66, for example, can be an air curtain that deploys to inflate between a passenger and a vehicle door.

The OCS 22 (the processing unit) is configured to selectively provide a plurality of deployment arming signals to the airbag control system 24 that correspond to one of a plurality of predetermined passenger categories, including, for example, no passenger, a child passenger, a first weight category passenger and a second weight category passenger. The predetermined passenger categories are determined based upon attenuation changes detected by the detection units 32 and 34 include changes in at least one of phase, polarity and intensity of light detected in the optical polymer sheet 42 of sensor mat 36 of the pressure sensor 18.

The OCS 22 preferably includes a microcomputer with an occupant classification program that processes the signals from the pressure sensor 18. In should be understood from the drawings and the description herein that he OCS 22 includes other conventional components such as an input and power interface circuit connected to the lead wire harness 40, an output interface circuit connected to the airbag deployment system 24 and storage devices such as a ROM (Read Only Memory) device and a RAM (Random Access Memory) device. The microcomputer of the OCS 22 is programmed to evaluate the output from the pressure sensor 18 and determine whether or not a mass is resting on the seat cushion portion 14 and whether or not the mass is a passenger, cargo or a car seat. The microcomputer of the OCS 22 is programmed to make a determination as to the approximate weight of the passenger, if the mass in the seat cushion portion 14 is a passenger.

The internal RAM of the OCS 22 stores data of predetermined criteria corresponding to the types of determinations made by the OCS 22. For example, the internal RAM and or ROM of the OCS 22 includes data corresponding to changes in dielectric capacitance of objects on the seat cushion portion 14. Such data includes information corresponding to dielectric capacitance of: various types of cargo (such as, for example, groceries or luggage); a human passenger sitting in the seat cushion portion 14; information corresponding to dielectric capacitance of a plastic car seat sitting in the seat cushion portion 14; and a plurality of weight distribution patterns corresponding to data outputted by the pressure sensor 18 in response to various weights of passengers seated on the seat cushion portion 14.

It will be apparent to those skilled in the art from this disclosure that the precise structure and algorithms for the OCS 22 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 11:
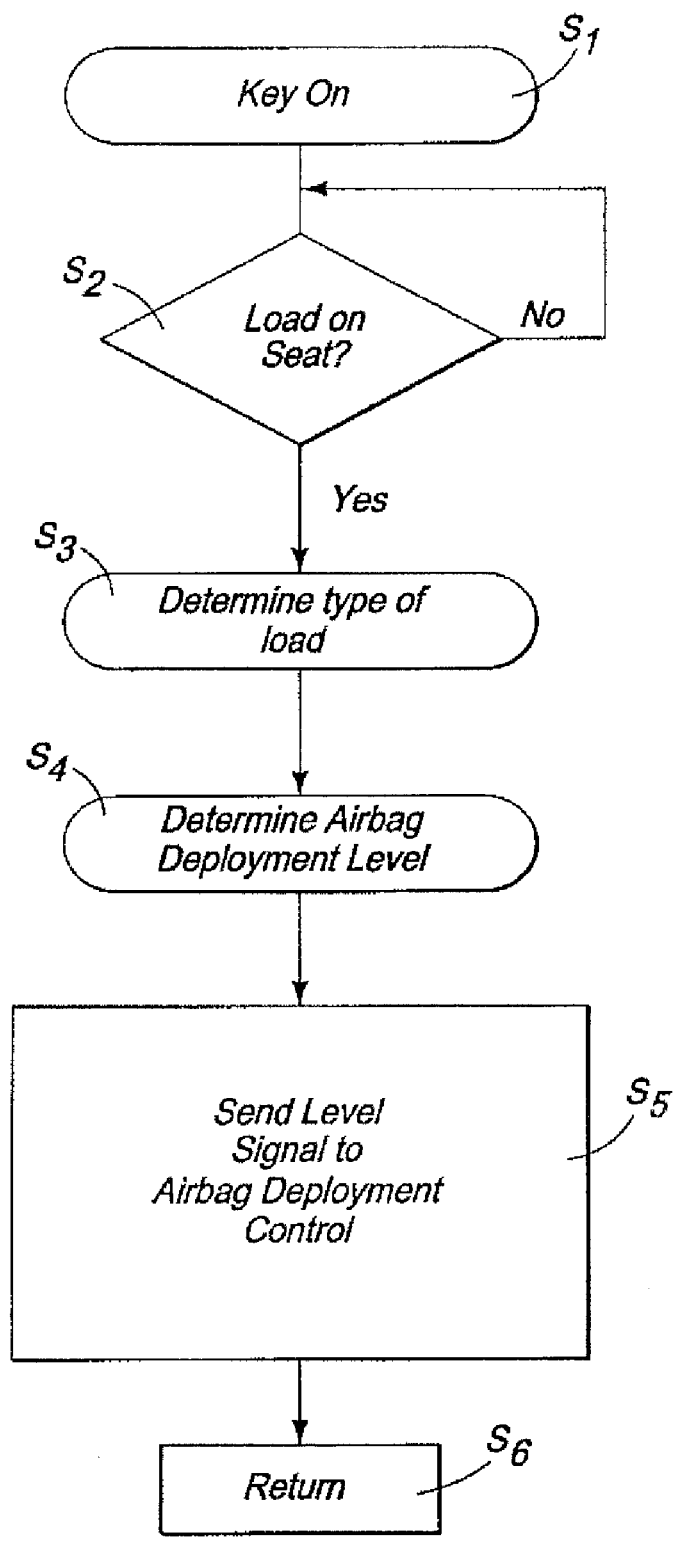
FIG. 11 is a flowchart showing basic steps of operation of the occupancy classification system in accordance with the first embodiment of the present invention.

A description of the operations programmed into the OCS 22 is now provided with specific reference to the flowchart shown in FIG. 11. As mentioned above, the OCS 22 is programmed and/or configured with several categories of information including, but not limited to, determining the following: whether or not there is a passenger on the seat cushion portion 14; whether or not a child seated in a car seat is present on the seat cushion portion 14; whether or not a passenger having a weight within a first weight range is seated on the seat cushion portion 14; whether or not a passenger having a weight within a second weight category is seated on the seat cushion portion 14; and whether or not cargo, such as groceries or luggage, is positioned on the seat cushion portion 14.

When the vehicle 10 is first operated, the ignition key (not shown) is inserted power is provide to the various systems of the vehicle 10, including the OCS 22, as indicated at step $S_1$. The OCS 22 in turn provides power to the light sources 30 and the detection units 32 and 34. The detection units 32 and 34 detect changes in attenuation of the sensor mat 36 and changes in dielectric capacitance of the sensor mat 36. At step $S_2$, a determination is made whether or not, a load or mass is present on the seat cushion portion 14. If there is no load, the OCS 22 continues to monitor and process output from the pressure sensor 18 and repeats step $S_2$ again. If a load is detected on the seat cushion portion 14, operation moves to step $S_3$. In step $S_3$, a determination is made concerning the type of load or mass present on the seat cushion portion 14.

Specifically, in step $S_3$ the OCS 22 receives signals from the pressure sensor 18. If a passenger is sitting on the seat cushion portion 14, a pattern of elastic deformation will be evident from the various signals transmitted from each of the detection sections 32a, 32b, 32c, 32d, 32e and 32f in the detection unit 32 and the detection sections 34a, 34b, 34c, 34d, 34e and 34f in the detection unit 34. Signals from the detection sections 32a-32f and 34a-34f are used by the OCS 22 to generate an internal image or pattern of attenuation of the weight distribution on the seat cushion portion 14. The image or pattern can be compared with data programmed into or stored within the ROM and/or RAM of the OCS 22 that corresponds to known images or patterns of attenuation representing weight distributions on a seat cushion.

In accordance with the shape of the passenger and the weight of the passenger, signals from the detection sections 32a-32f and 34a-34f are transmitted to the OCS 22. The OCS 22 then processes the received data in order to evaluate the images or patterns of attenuation. Further, changes in the dielectric capacitance of the sensor mat 36 are also detected and transmitted from the pressure sensor 18 to the OCS 22. The OCS 22 uses the received information from the pressure sensor 18 and compares it with stored data and information to determine the approximate weight of the mass on the seat cushion portion 14 from the weight distribution pattern on the zones $Z_1$-$Z_{12}$, and the appropriate classification of the load on the seat cushion portion 14. Specifically, the OCS 22 determines: whether or not there is a passenger on the seat cushion portion 14; whether or not a child seated in a car seat is present on the seat cushion portion 14; whether or not a passenger having a weight within a first weight range is seated on the seat cushion portion 14; whether or not a passenger having a weight within a second weight category is seated on the seat cushion portion 14; and whether or not cargo, such as groceries or luggage, is positioned on the seat cushion portion 14.

The above determinations performed by the OCS 22 in step $S_3$ include estimating the weight and location of the load placed on the seat cushion portion 14 and the presence of a passenger based upon detected changes outputted by the pressure sensor 18 (an optical sensor). These determinations include evaluation of the distribution of weight on each of the zones $Z_1$-$Z_{12}$. For instance, the distribution of weights on the zones $Z_1$-$Z_{12}$ can provide information to distinguish weight from cargo vs. weight applied by a passenger. Specifically, a square box will impress a pattern of weight distribution on the pressure sensor 18 that differs from the weight distribution impressed by a paper bag of groceries or the weight distribution impressed by a passenger. The determinations performed by the OCS 22 in step $S_3$ can also evaluate the acquired data to determine the exact location of the mass (cargo, passenger or car seat) on the seat cushion portion 14. In other words, the sensor readings from each individual one of the zones $Z_1$-$Z_{12}$ provides a weight distribution image or pattern that can be used to distinguish between types of cargo and weights of passengers along with location on the seat cushion portion 14. These images or patterns corresponding to types of cargo and weights of passengers when evaluated along with changes in the dielectric capacitance of the sensor mat 36 provide a reliable combination of data for identification of the contents of the seat cushion portion 14 and the location of those contents on the seat cushion portion 14.

At step $S_4$ the OCS 22 processes the determination made in step $S_3$. A variety of functions can be programmed into the OCS 22 for operations at step $S_4$. It should be understood from the drawings and description herein, that in alternate embodiments, alternative or additional operations or processing can be performed by the OCS 22 at step $S_4$, such as determining overall weight distribution within the vehicle 10 or some other safety related operation. However, in the first embodiment of the present invention, the OCS 22 determines which one of a plurality of deployment arming signals are to be provided to the airbag deployment system 24, based upon the detected changes outputted by the pressure sensor 18. For example, the deployment arming signals from the OCS 22 can include two or more of the following plurality of predetermined passenger categories, including: no passenger, a child's seat on seat cushion portion, a first weight category passenger and a second weight category passenger. It should be understood from the drawings and the description herein, that further passenger categories are conceived for the present invention. Specifically, the inventors conceive of more than two weight categories for passengers. For example, the inventors also conceive of detection of a child's seat and also detection of a child seated within the child's seat and corresponding deployment arming signals. More specifically, such additional categories can be used with airbag devices or airbag configurations with more than two levels of airbag deployment.

At step $S_5$ the OCS 22 transmits the appropriate signal to the airbag deployment system 24. If the impact event detection unit 60 determines that an impact event has occurred, the appropriate level of airbag deployment can occur based upon the signals sent to the airbag deployment system 24 from the OCS 22.

At step $S_6$ the OCS 22 returns to step $S_2$ and repeats all steps continuously while the vehicle 10 is operating in accordance with refresh rates necessary to timely update the deployment status of the airbag deployment system 24.

The actual signal provided by the OCS 22 is limited by the capability and configuration of the airbag deployment system 24. Specifically, if the airbag deployment system 24 only includes a single airbag, such as the airbag 62, then only three signals are appropriate: (child) car seat present, passenger present; or no passenger present. If the airbag deployment system 24 is more sophisticated, for example, with two or three levels of airbag deployment with airbags 62, 64 and 66, a larger number of deployment arming signals can be provided by the OCS 22. The level of airbag deployment is determined by legal safety requirements and the sophistication of the airbag deployment system 24. As mentioned above, the airbags 62 and 64 can be part of a single unit where both airbags 62 and 64 can be deployed to protect an adult passenger, but if a child seat is detected, only one of the airbags 62 and 64 can be deployed or no airbag can be deployed. Further, the airbag 66 can be configured as a side air curtain and be deployed only under certain circumstances and passenger weight levels. Alternatively all three airbags 62, 64 and 66 can be part of a single airbag mechanism providing three levels of deployment determined by three prescribed passenger weight categories. In other words, any of a variety of airbag deployment conditions can be designated and determined using the pressure sensor 18 and OCS 22 of the present invention.

The sensitivity of the pressure sensor 18 and the OCS 22 is such that accurate passenger weight measurements are easily achieved. The sensitivity of the pressure sensor 18 and the OCS 22 with respect to the dielectric effect detectors 52, 54a and 54b is such that the OCS 22 can discriminate between a passenger, a plastic child's car seat and a cargo load placed on a seat. It should be clear from the above description and the drawings, that the weight measurement sensitivity of the pressure sensor 18 and OCS 22 can be varied depending upon the corresponding functionality and complexity of the airbag deployment system within the vehicle 10. In other words, if the airbag deployment system 24 increases in complexity, with more than three or four levels of airbag deployment possible, the pressure sensor 18 and OCS 22 of the present invention have corresponding sensitivity and complexity to provide accurate passenger categorization.

Second Embodiment

Figure 12:
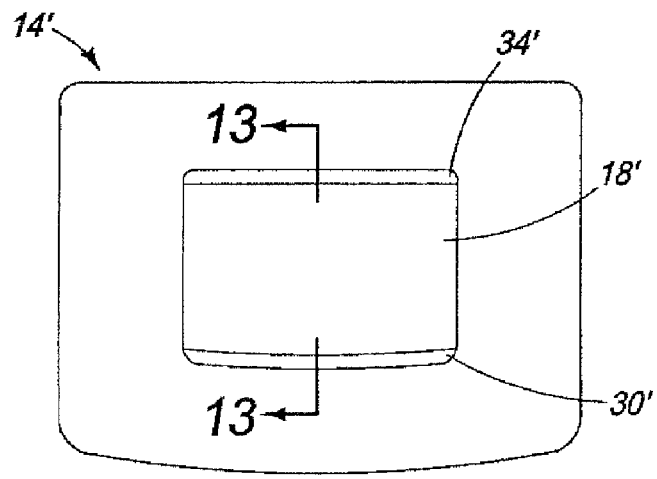
FIG. 12 is a cross-sectional view of a seat cushion and a pressure sensor similar to FIG. 4 showing a pressure sensor in accordance with a second embodiment of the present invention.
Figure 13:
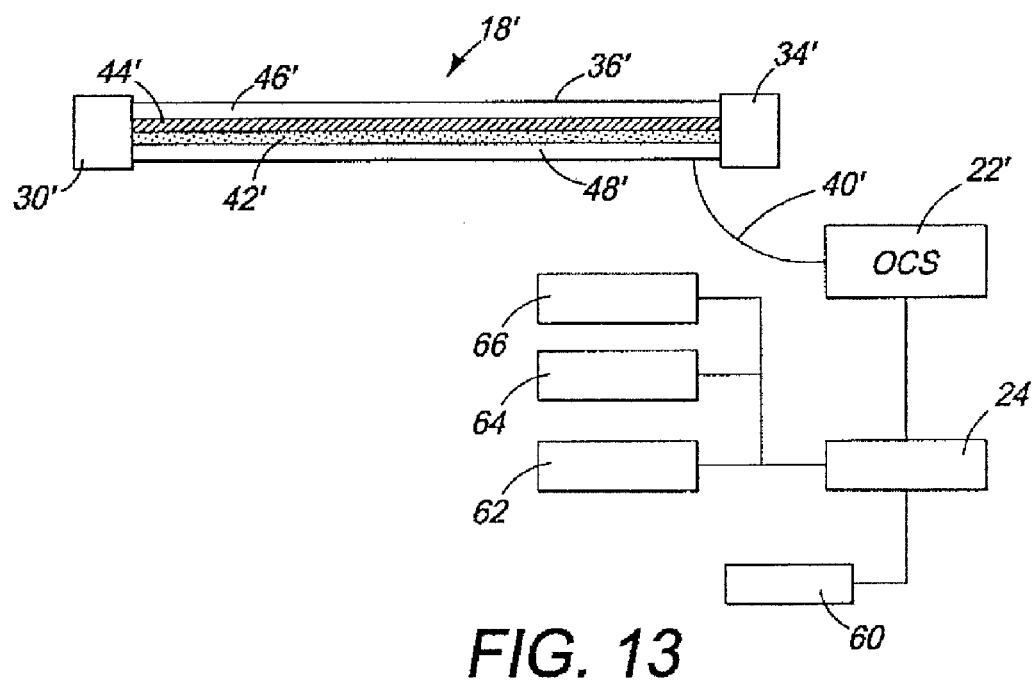
FIG. 13 is a schematic side cross-sectional view of the pressure sensor similar to FIG. 10 showing connections to an occupancy classification system, the airbag deployment controller and airbags in accordance with the second embodiment of the present invention.

Referring now to FIGS. 12 and 13, a seat cushion portion 14' and a pressure sensor 18' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The pressure sensor 18 of the first embodiment has a plurality of zones $Z_1$-$Z_{12}$. The level of sensitivity of the pressure sensor 18 far exceeds the needs of current airbag deployment systems. Specifically, the pressure sensor 18 can easily measure the weight of a passenger seated in the seat cushion portion 14 with a very small margin of error. Such sensitivity is not required for all airbag deployment systems. In the second embodiment, the pressure sensor 18' has level of sensitivity that exceeds the needs of current airbag deployment systems, but is less expensive to manufacture than the pressure sensor 18 of the first embodiment.

As best shown in FIG. 13, the a pressure sensor 18' includes a single zone having a optical polymer sheet 42', a boundary layer 44', a first optical insulating layer 46', a second optical insulating layer 48', a light source 30' and a detection unit 34'. In the first embodiment, the pressure sensor 18 included the light sources 30 and the detection units 32 and 34. In the pressure sensor 18, each of the light sources 30 is approximately perpendicular to both of the detection units 32 and 34. However, in the second embodiment the light source 30' and the detection unit 34' are arranged opposite to one another along the peripheral edge of the optical polymer sheet 42'. Further, in the second embodiment the light source 30' and the detection unit 34' are arranged parallel to one another along the peripheral edge of the optical polymer sheet 42'.

In the second embodiment, the pressure sensor 18' includes a single zone. As with each of the zones of the pressure sensor 18, the boundary layer 44' extends along the upper surface of the optical polymer sheet 42'. Further, the first optical insulating layer 46' covers the upper surface of the boundary layer 44' and the second optical insulating layer 48' covers the lower surface of the optical polymer sheet 42'. However, in the second embodiment, the optical polymer sheet 42', the boundary layer 44', the first optical insulating layer 46' and the second optical insulating layer 48' extend as a single zone sensor mat between the light source 30' and the detection unit 34'. The operation and function of the pressure sensor 18' is the same as any single one of the zones $Z_1$-$Z_{12}$ of the first embodiment.

As with the pressure sensor 18 of the first embodiment, the pressure sensor 18' is connected via an electric power and transmission line 40' to an OCS 22'. The OCS 22' is the same as the OCS 22 of the first embodiment, except that the OCS 22' is programmed and provided with attenuation and weight evaluating data in order to process signals from the pressure sensor 18' having a single zone, instead of the multiple zones of the first embodiment. As in the first embodiment, the OCS 22' is connected to the airbag deployment system 24. As described above in the first embodiment, the airbag deployment system 24 is further connected to the impact event detection unit 60 and the airbags 62, 64 and 66.

Third Embodiment

Referring now to FIG. 14, a pressure sensor 18" within a seat cushion portion in accordance with a third embodiment will now be explained. In view of the similarity between the first and third embodiments, the parts of the third embodiment that are identical to the parts of the first embodiments will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

The pressure sensor 18" is a single pressure sensor disposed within the depicted seat cushion portion and can be a single zone pressure sensor, like the pressure sensor 18' of the second embodiment, or can have any number of zones, similar to the zones $Z_1$-$Z_{12}$ of the pressure sensor 18 of the first embodiment. The pressure sensor 18" is not rectangular like the pressure sensor 18 or the pressure sensor 18', but has a trapezoid shape that conforms to the shape of the seat cushion portion and/or contours of the seat cushion portion. Consequently, the light source (not shown) and the detection unit(s) of the pressure sensor 18" are neither parallel nor perpendicular to one another.

Fourth Embodiment

Referring now to FIG. 15, pressure sensors 18a and 18b within a seat cushion portion in accordance with a fourth embodiment will now be explained. In view of the similarity between the first and fourth embodiments, the parts of the fourth embodiment that are identical to the parts of the first embodiments will be given the same reference numerals as the parts of the first embodiment. Moreover, the descriptions of the parts of the fourth embodiment that are identical to the parts of the first embodiment may be omitted for the sake of brevity.

The seat cushion depicted in FIG. 15 is contoured such that two pressure sensors such as the pressure sensors 18a and 18b are more suitable for approximating the weight of a passenger. The pressure sensor 18a can be a single zone pressure sensor, like the pressure sensor 18' of the second embodiment, or can have any number of zones, similar to the zones $Z_1$-$Z_{12}$ of the pressure sensor 18 of the first embodiment. Similarly, the pressure sensor 18b can be a single zone pressure sensor, like the pressure sensor 18' of the second embodiment, or can have any number of zones, similar to the zones $Z_1$-$Z_{12}$ of the pressure sensor 18 of the first embodiment.

Fifth Embodiment

Referring now to FIG. 16, pressure sensors 18c and 18d within a seat cushion portion in accordance with a fifth embodiment will now be explained. In view of the similarity between the first and fifth embodiments, the parts of the fifth embodiment that are identical to the parts of the first embodiments will be given the same reference numerals as the parts of the first embodiment. Moreover, the descriptions of the parts of the fifth embodiment that are identical to the parts of the first embodiment may be omitted for the sake of brevity.

The seat cushion depicted in FIG. 16 is contoured such that three pressure sensors such as the pressure sensors 18c and 18d are more suitable for approximating the weight of a passenger. The pressure sensors 18c are symmetrically shaped with respect to one another and can each be a single zone pressure sensor, like the pressure sensor 18' of the second embodiment, or can have any number of zones, similar to the zones $Z_1$-$Z_{12}$ of the pressure sensor 18 of the first embodiment. Similarly, the pressure sensor 18d can be a single zone pressure sensor, like the pressure sensor 18' of the second embodiment, or can have any number of zones, similar to the zones $Z_1$-$Z_{12}$ of the pressure sensor 18 of the first embodiment.

Sixth Embodiment

Referring now to FIG. 17, pressure sensors 18c and 18e within a seat cushion portion in accordance with a sixth embodiment will now be explained. In view of the similarity between the first, fifth and sixth embodiments, the parts of the sixth embodiment that are identical to the parts of the first and/or fifth embodiments will be given the same reference numerals as the parts of the first and/or fifth embodiment. Moreover, the descriptions of the parts of the sixth embodiment that are identical to the parts of the first and/or fifth embodiment may be omitted for the sake of brevity.

The seat cushion depicted in FIG. 17 is contoured such that four pressure sensors such as the pressure sensors 18c and 18e are more suitable for approximating the weight of a passenger. The pressure sensors 18c are the same as shown in the fifth embodiment. The pressure sensors 18e are symmetrically shaped with respect to one another and can each be a single zone pressure sensor, like the pressure sensor 18' of the second embodiment, or can have any number of zones, similar to the zones $Z_1$-$Z_{12}$ of the pressure sensor 18 of the first embodiment.

Seventh Embodiment

Figure 18:
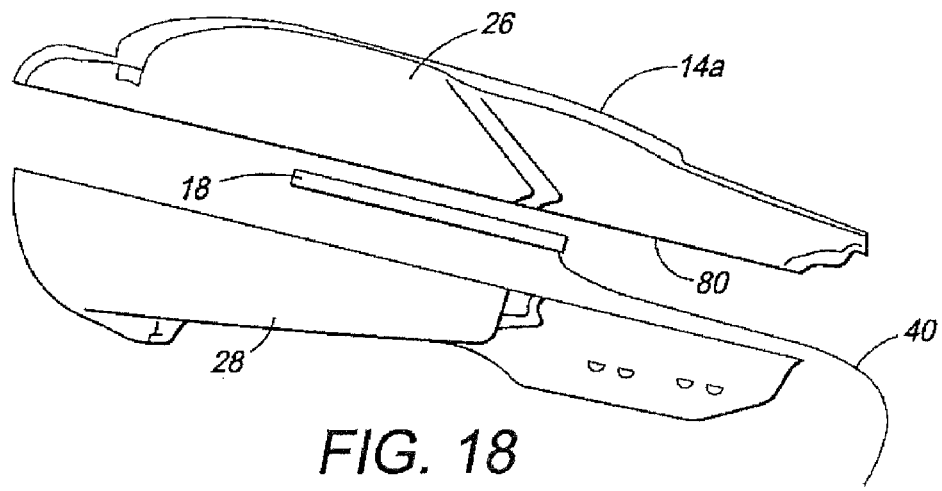
FIG. 18 is an exploded view of a seat cushion portion and a pressure sensor showing a method of assembly of the seat cushion portion in accordance with a seventh embodiment of the present invention.
Figure 19:
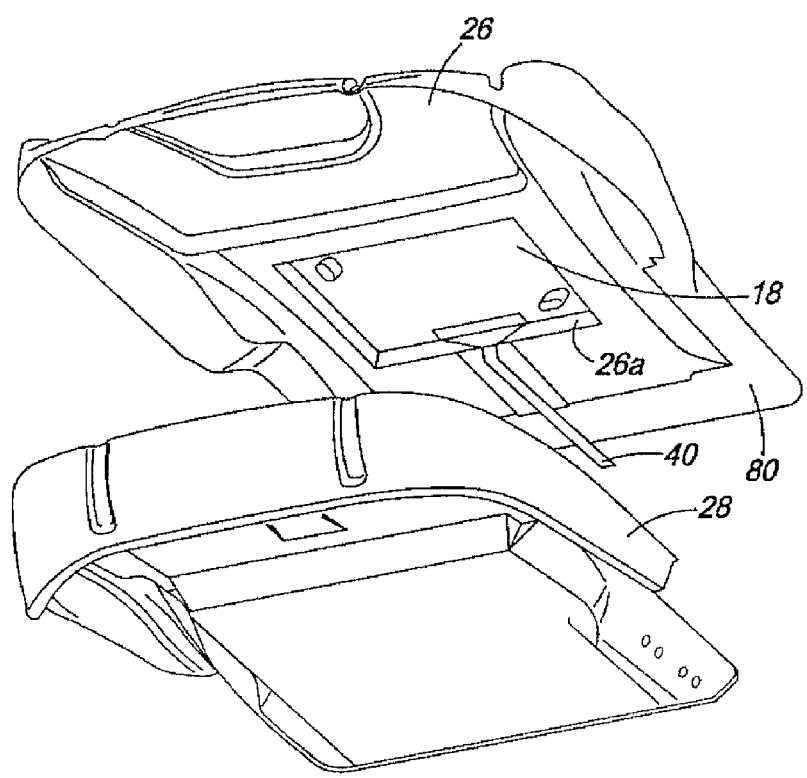
FIG. 19 is a perspective exploded view of the seat cushion portion and the pressure sensor showing the method of assembly of the seat cushion portion in accordance with the seventh embodiment of the present invention

Referring now to FIGS. 18 and 19, the seat cushion portion 14 of the first embodiment is depicted in exploded views in order to demonstrate one method of making the seat cushion portion 14 having at least one pressure sensor, such as the pressure sensor 18. In view of the similarity between the first and seventh embodiments, the parts of the seventh embodiment that are identical to the parts of the first embodiments will be given the same reference numerals as the parts of the first embodiment. Moreover, the descriptions of the parts of the seventh embodiment that are identical to the parts of the first embodiment may be omitted for the sake of brevity.

In the seventh embodiment, the seat cushion portion 14 is assembled by first forming the first cushion section 26 with the upper seating surface 14a and a lower joining surface 80. Further, a recess 26a is formed in the lower joining surface 80. Next, a flexible optical sensor such as the pressure sensor 18 (or any of the pressure sensors 18', 18", 18a, 18b, 18c, 18d and/or 18e) is inserted into the recess 26a of the first cushion section 26 with the lead wire harness 40 extending from the pressure sensor 18 (the flexible optical sensor) along the lower joining surface 80. Next, the second cushion section 28 is joined to the lower joining surface 80 of the first cushion section 26 to form the seat cushion portion 14 with the lead wire harness 40 from the pressure sensor 18 being externally exposed with respect to the first and second cushion sections 26 and 28. Hence, the sensor mat 36 of the pressure sensor 18 is encapsulated within the seat foam material that makes up the first and second cushion sections 26 and 28 during the seat cushion molding process.

Since the pressures sensor 18 is installed within the body of the seat cushion portion 14, the effect on passenger comfort is virtually unnoticeable due to the high flexibility of the sensor mat 36. The sensor mat 36 does not rely on seat frame for positioning or reaction force surface. Displacement of the foam material typically used to form the first and second cushion sections 26 and 28 has little or no effect on the output of the pressure sensor 18. Further, if a material is chosen for the first and second cushion sections 26 and 28 that effects the output of the pressure sensor 18, it is possible to program the OSC 22 with parameters to compensate for or cancel out any such effects.

Preferably, the recess 26a is formed such that the pressure sensor 18 is located between 5-10 mm beneath the upper surface 14a of the seat cushion portion 14, further minimizing any potential effect of the first cushion section 26 on pressure measurement.

It should be understood from the drawings and description herein that any one of various pressure sensor configurations of the present invention described herein can be molded into the seat cushion portion 14. It should further be understood from the drawings and description herein that any one of various pressure sensor configurations of the present invention described herein can be molded into either one of the first and second cushion sections 26 and 28. Further, in an alternative embodiment, the seat cushion portion can be molded as a single element around the seat cushion portion 14.

It should be understood from the drawings and the description herein that the pressure sensors described above can have any number of zones formed therein. Specifically, in the first embodiment, the pressure sensor 18 has twelve separate ones of the zones $Z_1$-$Z_{12}$ and in the second embodiment the pressure sensor 18' has only one zone. The pressure sensors 18a, 18b, 18c, 18d and 18e can have one zone, two zones, three zones, etc. In other words each of the various embodiments of pressures sensors described above is not limited with respect to the number of zones formed therein. The number of zones in each pressure sensor is dependent upon the desired sensitivity necessary to meet the requirements of the airbag deployment system 24 and the vehicle 10.

The various portions of the vehicle 10 and control units, such as micro computers that make up the OCS 22 are conventional components that are well known in the art. Since vehicles and micro computers are well known in the art, the various systems and structures of vehicles and micro computer will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat pressure sensor comprising:
   a light source;
   a non-fiber optical polymer sheet of non-woven flexible optical polymer material having a first surface with a peripheral edge surrounding the first surface aligned with the light source such that light emitted from the light source projects into the optical polymer sheet through the peripheral edge;
   a boundary layer disposed along the first surface of the optical polymer sheet; and
   a detection unit disposed relative to the optical polymer sheet to detect changes in attenuation of light emitted from the peripheral edge of the optical polymer sheet in response to elastic deformation of the boundary layer and the optical polymer sheet, a processing unit connected to the detection unit to estimate a weight and location of a load placed on the cushion portion and presence of a passenger based upon signals outputted by the detection unit.

2. The vehicle seat pressure sensor according to claim 1, further comprising
   a first optical insulating layer covering a second surface of the optical polymer sheet that is opposite the boundary layer; and
   a second optical insulating layer covering a surface of the boundary layer that is opposite the optical polymer sheet.

3. The vehicle seat pressure sensor according to claim 2, wherein
   the detection unit detects dielectric capacitance changes of the optical polymer sheet and at least one of the first and second optical insulating layers in response to changes in dielectric capacitance proximate the at least one of the first and second optical insulating layers and the optical polymer sheet.

4. The vehicle seat pressure sensor according to claim 1, wherein
   the light source and the detection unit are arranged perpendicularly to one another along the peripheral edge of the optical polymer sheet.

5. The vehicle seat pressure sensor according to claim 1, wherein
   the light source and the detection unit are arranged opposite to one another along the peripheral edge of the optical polymer sheet.

6. A vehicle seat pressure sensor comprising:
   a light source;
   a non-fiber optical polymer sheet of non-woven flexible optical polymer material having a first surface with a peripheral edge surrounding the first surface aligned with the light source such that light emitted from the light source projects into the optical polymer sheet through the peripheral edge;
   a boundary layer disposed along the first surface of the optical polymer sheet; and
   a detection unit disposed relative to the optical polymer sheet to detect changes in attenuation of light emitted from the peripheral edge of the optical polymer sheet in response to elastic deformation of the boundary layer and the optical polymer sheet, wherein
   the optical polymer sheet includes a plurality of optical polymer sheet sections defining a plurality of sensing zones with each of the sensing zones at least partially forming a part of the peripheral edge of the optical polymer sheet,
   the light source is configured to emit a separate light beam to each of the sensing zones, and
   the detection unit is disposed to separately detect the separate light beam from each of the sensing zones.

7. The vehicle seat pressure sensor according to claim 6, wherein
   each of the optical polymer sheet sections has an L-shape with a first end disposed along the peripheral edge of the optical polymer sheet adjacent the light source and a second end disposed along the peripheral edge of the optical polymer sheet adjacent the detection unit.

8. The vehicle seat pressure sensor according to claim 7, wherein
   the light source includes a first light emitting device disposed at a first location along the peripheral edge of the optical polymer sheet and a second light emitting device disposed at a second location along the peripheral edge of the optical polymer sheet.

9. The vehicle seat pressure sensor according to claim 7, wherein
   the optical polymer sheet includes at least four of the optical polymer sheet sections with the L-shape that are arranged such that the first ends of a first pair of the at least four of the optical polymer sheet sections face in a first direction and a second pair of the at least four of the optical polymer sheet sections face in a second direction that is opposite the first direction.

10. The vehicle seat pressure sensor according to claim 1, further comprising
a seat cushion portion having an upper outer surface and a lower outer surface with the vehicle seat sensor disposed within the cushion portion between the upper and lower outer surfaces.

11. The vehicle seat pressure sensor according to claim 1, wherein
the optical polymer sheet is a flat member with a second surface parallel to the first surface.

12. The vehicle seat pressure sensor according to claim 11, wherein
the optical polymer sheet has a thickness that is no greater than four millimeters as measured between the first and second surfaces.

13. The vehicle seat pressure sensor according to claim 12, wherein
the first and second surfaces have a first linear dimension that is at least 23 millimeters as measured perpendicular to the thickness of the optical polymer sheet.

14. The vehicle seat pressure sensor according to claim 13, wherein
the first and second surfaces have a second linear dimension that is at least 40 millimeters as measured perpendicular to the thickness and the first linear dimension of the optical polymer sheet.

15. The vehicle seat pressure sensor according to claim 1, wherein
the processing unit is configured to selectively provide a plurality of deployment arming signals to an airbag control system that correspond to one of a plurality of predetermined passenger categories, including no passenger, a child passenger, a first weight category passenger and a second weight category passenger.

16. The vehicle seat pressure sensor according to claim 1, wherein the attenuation changes detected by the detection unit include changes in at least one of phase, polarity and intensity of light.

\* \* \* \* \*